United States Patent
Bhattacharya (10) Patent No.: US 11,300,194 B2
(45) Date of Patent: Apr. 12, 2022

(54) IN-SITU TUNING SYSTEM FOR SPEED INCREASING GEARBOX AND PINION RESONANCE

(71) Applicant: Mantosh Isanchandra Bhattacharya, Patna (IN)

(72) Inventor: Mantosh Isanchandra Bhattacharya, Patna (IN)

( * ) Notice: Subject to any disclaimer, the term of this patent is extended or adjusted under 35 U.S.C. 154(b) by 135 days.

(21) Appl. No.: 16/639,262

(22) PCT Filed: Feb. 5, 2019

(86) PCT No.: PCT/IB2019/050890
§ 371 (c)(1),
(2) Date: Feb. 14, 2020

(87) PCT Pub. No.: WO2019/207366
PCT Pub. Date: Oct. 31, 2019

(65) Prior Publication Data
US 2020/0248739 A1     Aug. 6, 2020

(30) Foreign Application Priority Data
Apr. 25, 2018 (IN) .............. 201831015690

(51) Int. Cl.
*F16H 57/02* (2012.01)
*F16C 7/06* (2006.01)
*F16H 57/028* (2012.01)
*F16F 15/10* (2006.01)

(52) U.S. Cl.
CPC .......... *F16H 57/028* (2013.01); *F16F 15/10* (2013.01); *F16H 57/02* (2013.01); *F16C 7/06* (2013.01)

(58) Field of Classification Search
CPC .......... F16H 1/00; F16H 57/02; F16H 57/028; F16F 15/10; F16F 15/131; F16C 7/06
See application file for complete search history.

(56) References Cited

U.S. PATENT DOCUMENTS

| | | | | |
|---|---|---|---|---|
| 3,242,791 A | * | 3/1966 | Smith ................... | F16F 7/108 188/379 |
| 3,800,555 A | * | 4/1974 | Arneson ................ | F16F 15/10 464/138 |
| 6,373,205 B1 | | 4/2002 | Weimer et al. | |

OTHER PUBLICATIONS

International Search Report and Written Opinion for International Patent No. PCT/IB2019/050890 filed Feb. 5, 2019; 8 pgs.

* cited by examiner

*Primary Examiner* — Adam D Rogers (57) ABSTRACT

The present disclosure relates to a tuning system for modulating stiffness of a gearbox 102 and a pinion 502. The tuning system comprises one or more incremental masses 606 adapted to be attached to a non-drive end (NDE) side 504 of the pinion 502 of the gearbox 102 to allow modulation of resonant frequency of the pinion 502, and a plurality of tie rods 104 coupled between a base plate 106 of the gearbox 102 and split axial line 108 casing of the gearbox 102, wherein the plurality of tie rods 104 are adapted to modulate effective stiffness of the gearbox casing in a specific direction.

10 Claims, 8 Drawing Sheets

IN-SITU TUNING SYSTEM FOR SPEED INCREASING GEARBOX AND PINION RESONANCE

TECHNICAL FIELD

The present disclosure relates generally to transmission tuning systems, and more particularly to a tuning system for modulating effective stiffness of a gearbox as well as a pinion to prevent a specific resonant mode of the gearbox and the pinion.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Rotational movement and meshing of gears of a transmission system/gearbox produce vibrations that are transmitted to a casing/housing of the transmission tuning system. When natural resonant frequency of the casing confers with certain resonant modes of the transmission tuning system excited by a forcing frequency, high vibrations are encountered in the casing. More often, dynamic behavior of the casing interacts with set of gears of the transmission tuning system.

Due to vibrations of a casing of the gearbox during its operation, frequency and shape of each resonant mode are different from those measured while the gearbox is stationary. Investigation of possibility of structural resonance excited by forcing frequency of the casing is a lengthy process. Static and dynamic analysis along with harmonic analysis is to be carried out to assess stiffness of the casing. However, during varying combination of load and speed, some of the excitation frequencies may be in resonance with natural frequency of the casing. To ascertain and mitigate such an anomaly, deflection shape analysis or time consuming experimental modal analysis is carried out and then modifications are performed by complete removal of affected unit of the gearbox.

At a certain load and speed combination, higher modes of resonant frequencies are excited causing very high vibration in a pinion of the gearbox. To address this anomaly a lot of data are taken at various load speed conditions and possibility of torsional-lateral coupling mode are investigated which is a time consuming exercise. Once the anomaly is detected, damping calculation and mode shape analysis of excitation of pinion is performed and then a detailed deliberation to opt either pinion detuning (shifting natural frequency by changing modal mass) or changing bearing span is carried out. Another anomaly encountered is super-synchronous vibration in the pinion.

Conventionally, to correct such anomalous dynamics many analytical and iterative methods have been tried that are time consuming processes. To carry out such analytical and iterative methods complex calculations and hot work such as, welding, gas cutting is required at a site where the transmission tuning system is installed. Further, to implement such analytical and iterative methods pinions are needed be removed from the gearbox casing in case a modification work is required.

There is therefore a need in the art to provide a tuning system for a gearbox where the tuning system allows modulation/altering of effective stiffness of the gearbox in a particular direction to prevent a specific resonant mode of the gearbox. Further, there exists a need to design and fabricate a gearbox that allows modulation/tuning of resonant frequency of its casing and pinion gears in order to mitigate super-synchronous vibration.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

It is an object of the present disclosure to provide a tuning system for a transmission system/gearbox to allow modulation of effective stiffness of the gearbox in a particular direction.

It is another object of the present disclosure to provide a tuning system for a gearbox that prevents a particular resonant mode of the gearbox by altering effective stiffness of the gearbox.

It is another object of the present disclosure to provide a tuning system for a gearbox that allows modulation of effective stiffness of the gearbox without disassembly of gearbox components and without removal of the gearbox from the site.

It is another object of the present disclosure to provide a tuning system for modulating stiffness of a pinion of the gearbox that mitigates super-synchronous vibration conditions.

It is another object of the present disclosure to provide a tuning system for modulating resonant frequency of the pinion in order to achieve pinion resonance.

It is yet another object of the present disclosure to provide a tuning system for a gearbox that eliminates implementation of intricate analytical and iterative methods to alter effective stiffness of the gearbox.

It is still another object of the present disclosure to provide a gearbox that does not requires hot working such as, welding, gas cutting to be carried out at a site where the gearbox is installed to effect modulation of stiffness of the gearbox.

SUMMARY

The present disclosure relates a tuning system for modulating effective stiffness of a gearbox as well as a pinion to prevent a specific resonant mode of the gearbox and the pinion. Aspects of the present disclosure provide a tuning system for modulating stiffness of a gearbox and a pinion, the tuning system including one or more incremental masses adapted to be attached to a non-drive end (NDE) side of a pinion of the gearbox to allow modulation of resonant frequency of the pinion, and a plurality of tie rods coupled between a base plate of the gearbox and split axial line of a casing of the gearbox, wherein the plurality of tie rods are adapted to modulate effective stiffness of the casing in a specific direction.

In an embodiment, each of the plurality of tie rods has a first part coupled to a protrusion of one or more base plate holding bolts of the gearbox and a second part coupled to a protrusion of one or more tightening bolts fixed with the axial split line of the casing.

In an embodiment, the tuning system further includes a threaded stud disposed between the first part and the second part, wherein one or more lock nuts are provided on both sides of the threaded stud to fix each of the plurality of tie rods once the threaded stud is fully locked.

In an embodiment, a plurality of protruded studs are welded at appropriate locations of the casing. In an embodiment, one or more flat metal bars having a set of drilled holes are screwed with each of the plurality of protruded studs to allow over-tuning of the gearbox.

In an embodiment, at least one of the plurality of protruded studs is configured with one or more weight elements. In an embodiment, each of the one or more weight elements comprises a slot to allow securing of the one or more weight elements with the at least one of the plurality of protruded studs by inserting a rod into the slot to effect under-tuning of the gearbox.

In an embodiment, the pinion has a centered groove at its NDE side to allow attachment of the one or more incremental masses with the pinion by fastening a through bolt into the centered groove to secure the one or more incremental masses with the pinion.

In an embodiment, interaction of the through bolt with the centered groove allows attachment and detachment of the one or more incremental masses with NDE side of the pinion.

In an embodiment, each of the plurality of incremental plugged masses is composed of up to 9% of total mass of the pinion.

In an embodiment, each of the one or more incremental masses includes at least one disk secured to each of the one or more incremental masses through a set of mating grooves. In an embodiment, each of the plurality of incremental plugged masses is screwed with the at least one disk using one or more high tension countersunk bolts.

In an embodiment, the plurality of tie rods are coupled between the protrusion of the one or more base plate holding bolts and the protrusion of one or more tightening bolts fixed with the axial split line of the casing to allow tuning of resonant frequency of the gearbox at a site without performing disassembly of one or more components of the gearbox.

Those skilled in the art will further appreciate the advantages and superior features of the disclosure together with other important aspects thereof on reading the detailed description that follows in conjunction with the drawings.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms as used herein are shown below. To the extent a term used in a claim is not defined below, it should be given the broadest definition persons in the pertinent art have given that term as reflected in printed publications and issued patents at the time of filing.

The present disclosure relates a tuning system for modulating effective stiffness of a gearbox as well as a pinion to prevent a specific resonant mode of the gearbox and the pinion. Aspects of the present disclosure provide a tuning system for modulating stiffness of a gearbox and a pinion, the tuning system including one or more incremental masses adapted to be attached to a non-drive end (NDE) side of a pinion of the gearbox to allow modulation of resonant frequency of the pinion, and a plurality of tie rods coupled between a base plate of the gearbox and split axial line of a casing of the gearbox, wherein the plurality of tie rods are adapted to modulate effective stiffness of the casing in a specific direction.

In an embodiment, each of the plurality of tie rods has a first part coupled to a protrusion of one or more base plate holding bolts of the gearbox and a second part coupled to a protrusion of one or more tightening bolts fixed with the axial split line of the casing.

In an embodiment, the tuning system further includes a threaded stud disposed between the first part and the second part, wherein one or more lock nuts are provided on both sides of the threaded stud to fix each of the plurality of tie rods once the threaded stud is fully locked.

In an embodiment, a plurality of protruded studs are welded at appropriate locations of the casing. In an embodiment, one or more flat metal bars having a set of drilled holes are screwed with each of the plurality of protruded studs to allow over-tuning of the gearbox.

In an embodiment, at least one of the plurality of protruded studs is configured with one or more weight elements. In an embodiment, each of the one or more weight elements comprises a slot to allow securing of the one or more weight elements with the at least one of the plurality of protruded studs by inserting a rod into the slot to effect under-tuning of the gearbox.

In an embodiment, the pinion has a centered groove at its NDE side to allow attachment of the one or more incremental masses with the pinion by fastening a through bolt into the centered groove to secure the one or more incremental masses with the pinion.

In an embodiment, interaction of the through bolt with the centered groove allows attachment and detachment of the one or more incremental masses with NDE side of the pinion.

In an embodiment, each of the plurality of incremental plugged masses is composed of up to 9% of total mass of the pinion.

In an embodiment, each of the one or more incremental masses includes at least one disk secured to each of the one or more incremental masses through a set of mating grooves. In an embodiment, each of the plurality of incremental plugged masses is screwed with the at least one disk using one or more high tension countersunk bolts.

In an embodiment, the plurality of tie rods are coupled between the protrusion of the one or more base plate holding bolts and the protrusion of one or more tightening bolts fixed with the axial split line of the casing to allow tuning of resonant frequency of the gearbox at a site without performing disassembly of one or more components of the gearbox.

Figure 1:
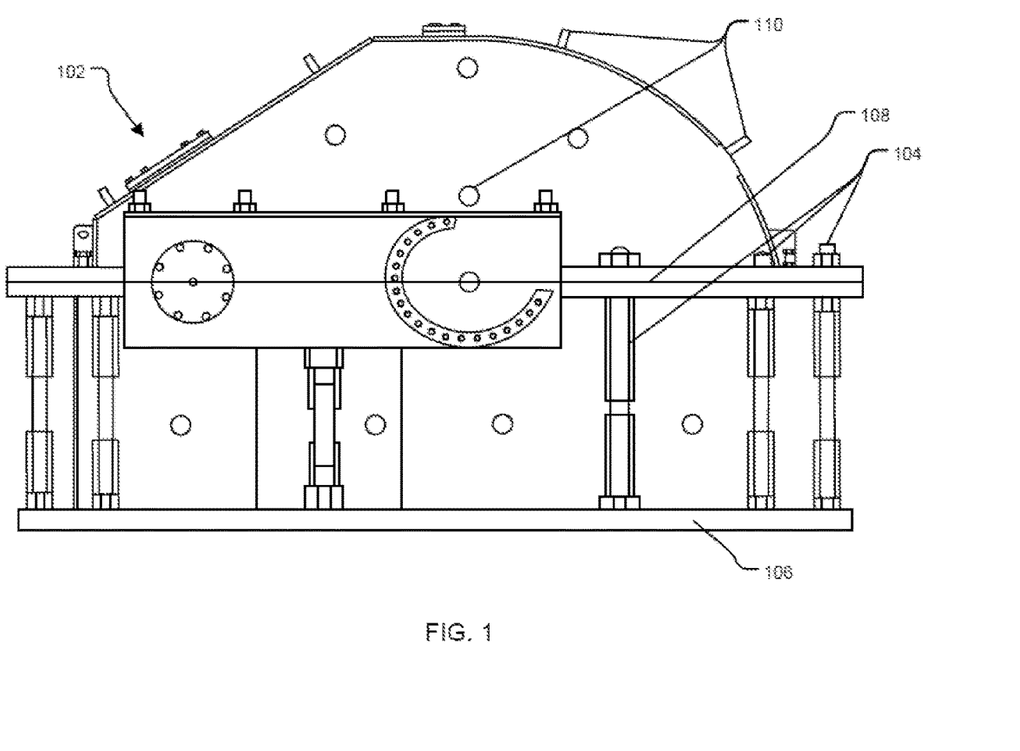
FIG. 1 illustrates an exemplary representation of a gearbox incorporated with a plurality of protruded studs and tie rod, in accordance with an embodiment of the present disclosure.

FIG. 1 illustrates an exemplary representation of a gearbox incorporated with a plurality of protruded studs and tie rod, in accordance with an embodiment of the present disclosure. In an aspect, the disclosed tuning system for modulation of effective stiffness of the gearbox 102 can include a plurality of tie rods 104 arranged between a base plate 106 of the gearbox 102 and an axial split line 108 of the gearbox 102 such that the tie rods 104 can allow pre-tensioning of a casing of the gearbox 102, thereby allowing modulation of resonant frequency of the casing to enable dampening of vibrations generated during operation of the gearbox 102.

Figure 2:
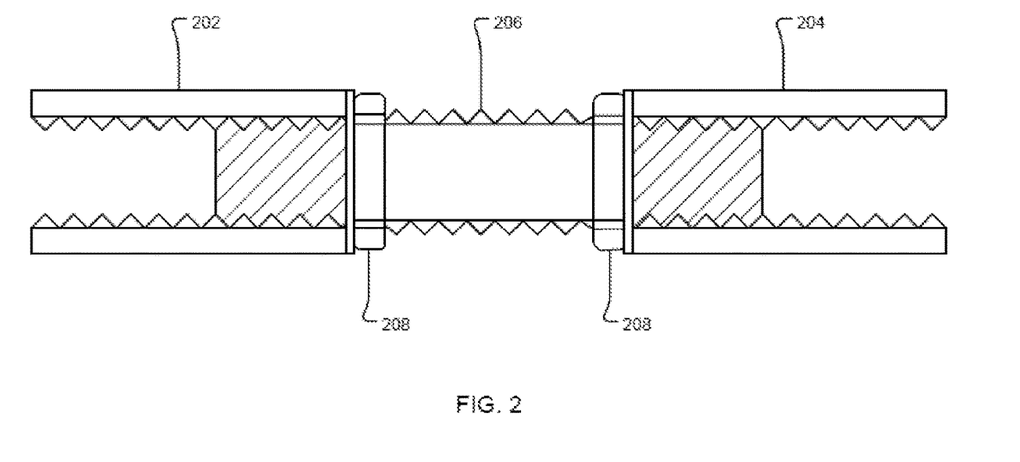
FIG. 2 illustrates an exemplary representation of a tie rod of the proposed tuning system for modulation of stiffness of the gearbox in accordance with an embodiment of the present disclosure.

In an aspect, tie rods 104 may be attached from a protrusion of base plate holding bolts and may be connected with tightening bolts (as shown in FIG. 2) fixed with axial split line of the casing to allow tuning of resonant frequency of the gearbox 102 at a site without performing disassembly of components of the gearbox 102 such as, but not limited to gear shafts, pinion gears and the likes.

In an embodiment, the proposed tuning system to provide stiffness and shifting resonance mode of the speed increasing gearbox casing to a higher value than its exciting frequency do so by reducing transfer of vibrations from the base plate 106 to the axial split line 108 of the casing, or vice versa by harnessing tensioning forces generated due to coupling of the tie rods 104 between the base plate 106 and the axial split line 108 of the casing.

In an embodiment, the proposed tuning system provides for design and fabrication of the gearbox 102 where effective stiffness of the gearbox 102 can be altered in a particular direction, thus preventing a particular resonant mode based on casing vibration and phase readings taken at an installation site. The design incorporates components that can be fixed at the installation site to lower or raise the resonant frequency of gearbox casing without carrying out disassembly of any internal component of the gearbox 102. In addition, the proposed tuning system provides for mitigation of super-synchronous vibration of a pinion of the speed increasing gearbox 102.

In an embodiment, the gearbox casing can be provided with a plurality of protruded studs 110 that may be welded to the casing using any welding technique as known in the art. The protruded studs 110 can be adequately sized and can be located at various locations over outer shell of the casing.

Referring now to FIG. 2, where an exemplary representation of a tie rod of the proposed tuning system is shown, a tie rod 104 can include a first part 202 that may be coupled to protrusions of one or more base plate holding bolts of the gearbox 102 and a second part 204 that may be coupled to protrusions of one or more tightening bolts fixed with the axial split line 108 of the casing. The first part 202 and the second part 204 can be in the form of forks or threaded shafts having a set of teeth on their at least one outer surface to allow fixing of the first part 202 and the second part 204 with respective protrusions. In an embodiment, the first part 202 may be fixed with a protrusion of base plate holding bolts and the second part 204 may be fixed with a protrusion of the tightening bolts of the axial split line 108 of the gearbox casing.

In an embodiment, an adjustable stud 206 (also referred to as "threaded stud" hereinafter) may be disposed between the first part 202 and the second part 204 and one or more lock nuts 208 are provided on both sides of the threaded stud 206 to fix the tie rod 104 once the threaded stud 206 is fully locked.

Figure 3:
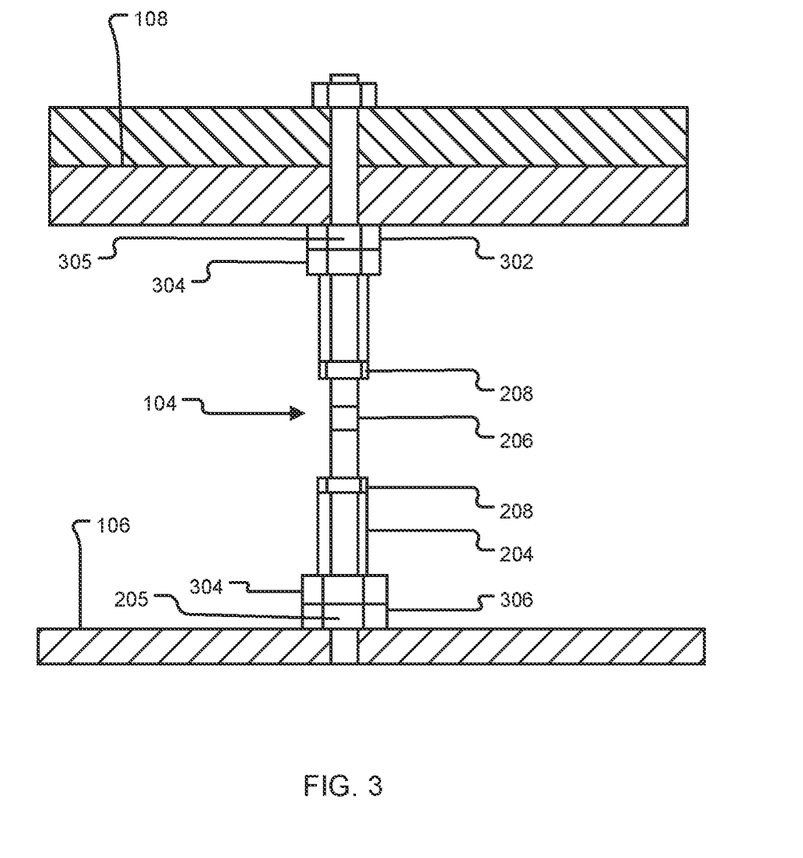
FIG. 3 illustrates an exemplary representation of a tie rod installed between a base plate and axial split line of a casing of the gearbox in accordance with an embodiment of the present disclosure.

Referring now to FIG. 3, where an exemplary representation of a tie rod 104 installed between base plate 106 and axial split line 108 of a casing of the gearbox 102 is shown, it can be initially ensured that movement of base plate holding bolts 302 and the tightening bolts 306 fixed to the axial split line 108 of the casing are secured through one or more check nuts 304. Thereafter, the first part 202 and the second part 204 can be screwed on protrusion 205 of the base plate holding bolts 302 and protrusion 305 of the tightening bolts 306 fixed to axial split line 108 of the casing. Once securing of the base plate holding bolts 302 and the tightening bolts 306 is ensured, one side of the threaded stud 206 can be extended to connect with the first part 202 and other side of the threaded stud 206 can be extended to connect with the second part 204. Once secured, the check nuts 208 of the tie rod 104 are snug tightened to provide a tensioning mechanism that can pre-tension casing of the gearbox 102 in order to reduce resonant frequency of the gearbox casing and to improve effective stiffness of the gearbox 102.

Figure 4A:
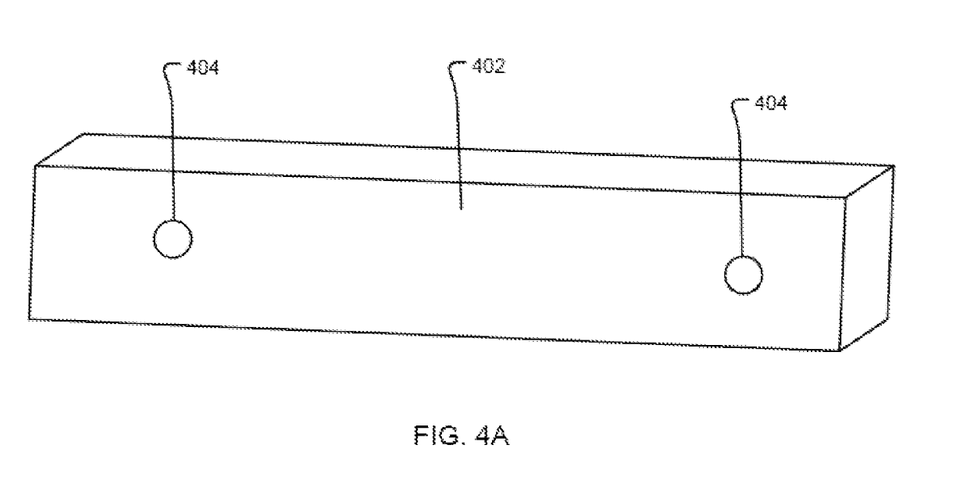
FIG. 4A illustrates an exemplary representation of a flat metal bar that may be coupled with the protruded bars to increase stiffness of the gearbox in accordance with an embodiment of the present disclosure.

FIG. 4A illustrates an exemplary representation of a flat metal bar that may be coupled with the protruded bars to increase stiffness of the gearbox in accordance with an embodiment of the present disclosure. In an embodiment, the protruded studs 110 may be welded to the gearbox casing using any suitable welding technique such as, gas welding, Metal Inert Gas (MIG) welding and other suitable welding techniques. The protruded studs 110 can be adequately sized and can be located at various locations over outer shell of the casing. A plurality of flat metal bars 402 having drilled holes 404 can be coupled with the protruded studs 110 that are welded on a casing of the gearbox 102 to effect over-tuning of the gearbox 102. In an embodiment, the flat metal bars 402 can be screwed to the protruded studs 110.

In an embodiment, number of protruded studs 110 to be welded to the casing and number of flat metal bars 402 to be used are based on modal shape analysis of gearbox casing deflection.

Figure 4B:
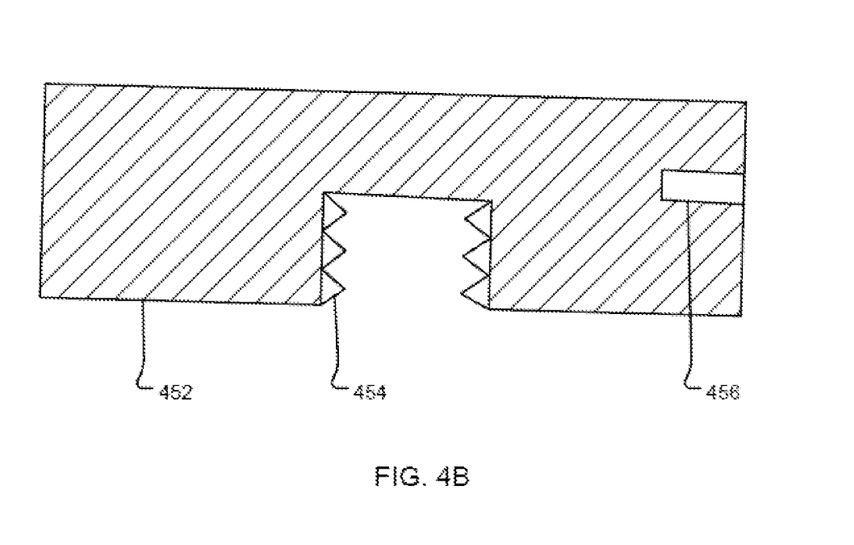
FIG. 4B illustrates an exemplary representation of a weight element that may be coupled with a protruded stud to under-tune the stiffness of the gearbox in accordance with an embodiment of the present disclosure.

FIG. 4B illustrates an exemplary representation of a weight element that may be coupled with a protruded stud to improve stiffness of the gearbox in accordance with an embodiment of the present disclosure. In an embodiment, if under-tuning of the gearbox 102 is required then some calculated weight elements 452 can be attached with the casing by use of the protruded studs 110. The weight elements 452 may include a threaded portion 454 that allows screwing of the weight elements 452 with the protruded studs 110. In an embodiment, the weight elements 452 may include a slot 456 that assists tightening of the weight elements 452 when they are screwed with the protruded studs 110. A tightening rod (not shown) can be inserted into the slot 456 to enable tightening of the weight elements 452 with the protruded studs 110.

In an embodiment, coupling of the weight elements 452 with the protruded studs 110 that are welded to the casing can shift resonance mode of the casing to a lower value than an exciting frequency. It would be appreciated that when the resonance mode of the gearbox casing is shifted lower than its exciting frequency high vibrations are not caused during operation of the gearbox 102, and thus, the proposed tuning system helps in reducing vibration of the gearbox 102 during its operation.

Figure 5:
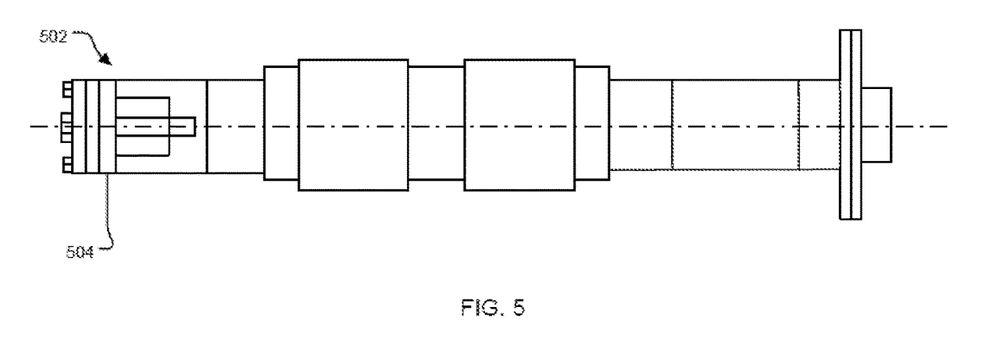
FIG. 5 illustrates an exemplary representation of a pinion of the gearbox in accordance with an embodiment of the present disclosure.

FIG. 5 illustrates an exemplary representation of a pinion of the gearbox in accordance with an embodiment of the present disclosure. In an aspect, the proposed tuning system can modulate stiffness of a pinion 502 of the gearbox 102 by mitigating super-synchronous vibrations. The proposed tuning system can include one or more incremental masses (as shown in FIGS. 6A and 6B) adapted to be attached to a non-drive end (NDE) side 504 of the pinion 502 to allow modulation of resonant frequency of the pinion 502.

In an embodiment, to determine what type of tuning of the pinion 502, i.e., under-tuning or over-tuning, is required, rotor-dynamic analysis may be carried out to indicate whether to shift natural frequency of the pinion 502 and to ensure that new resonant frequency is damped and will get excited by higher harmonics at certain load-speed combination.

Figure 6A:
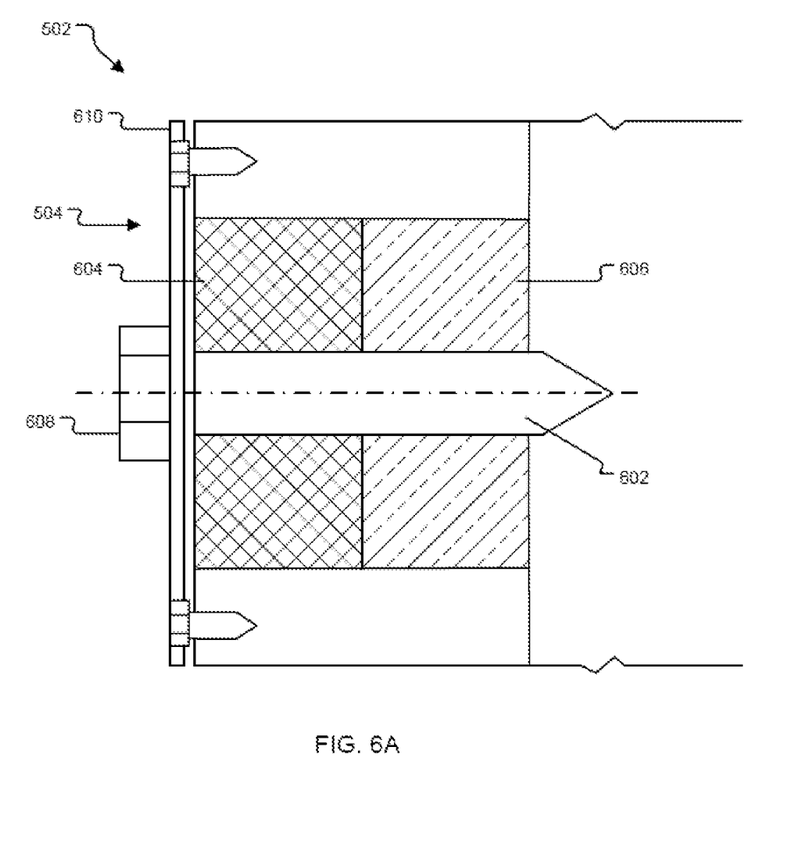
FIGS. 6A and 6B illustrate exemplary representations of a plurality of incremental masses to be removed or attached to the pinion in accordance with an embodiment of the present disclosure.
Figure 6B:
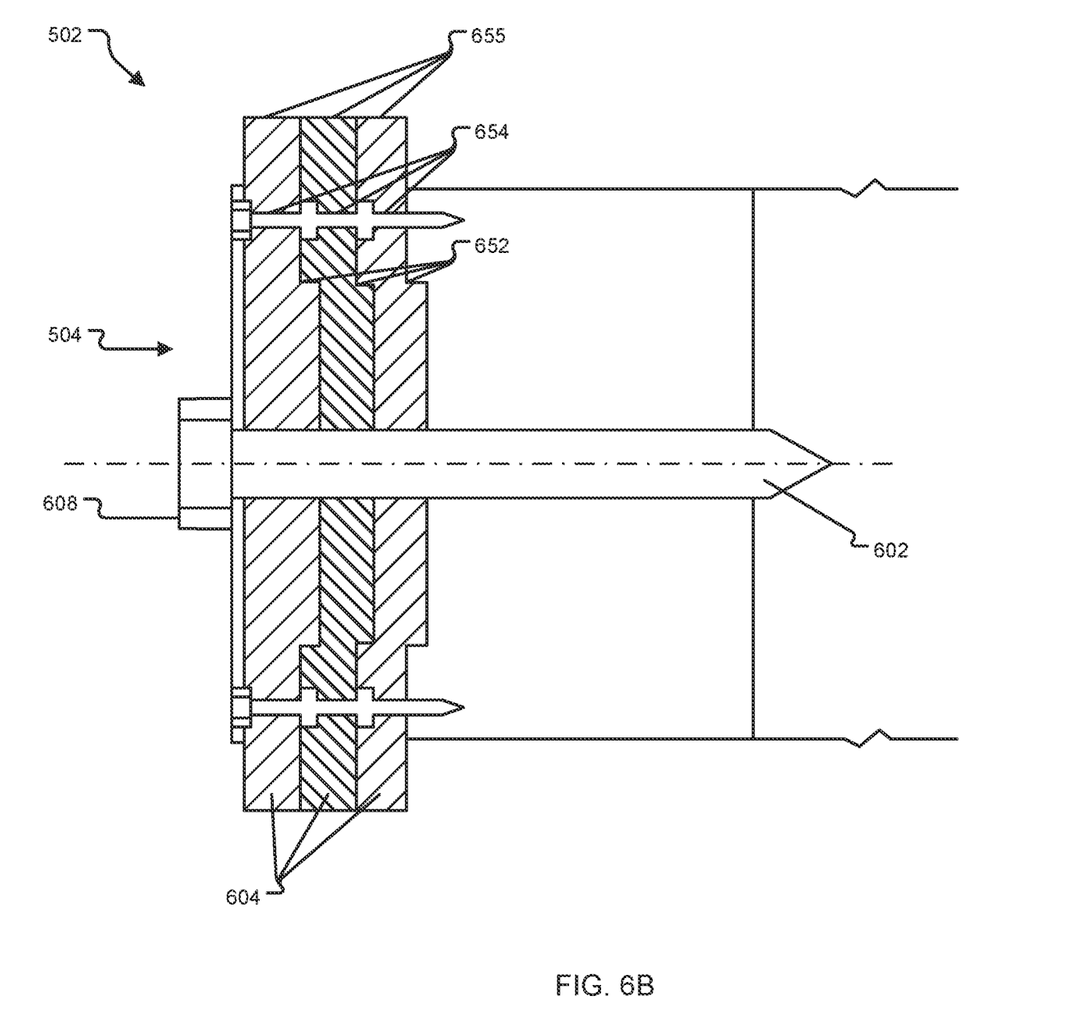

FIG. 6A illustrates exemplary representations of a plurality of incremental masses already plugged to the pinion by gear box manufacturer in accordance with an embodiment of the present disclosure. In an embodiment, the pinion 502 may have a centered groove 602 on its NDE side 504 where incremental masses 606 are plugged which can be removed to raise resonant frequency of the pinion 502.

In an embodiment, if less number of incremental masses 606 are to be removed from the pinion 502, the void space 604 within the pinion 502 may be filled with foam. Incremental masses 606 may be in the form of plugs and may be removed from NDE side 504 of the pinion 502 in order to lower natural frequency of pinion 502.

In an embodiment, a through bolt 608 is passed through the centered hole 602 of the pinion 502 to secure plugged masses 606 and to slow rotation of the pinion 502 is done for alignment of the plugged masses 606. In an embodiment, direction of the rotation required for alignment of the plugged masses 606 can be illustrated on a cover plate 610 located on NDE side 504 of the pinion 502 to prevent torqueing of the pinion 502 in wrong direction.

FIG. 6B illustrates exemplary representations of a plurality of incremental masses in form of thick disks which can be attached to pinion NDE side 504. As illustrated in FIG. 6B, each of the incremental masses 606 may be secured through mating grooves 652 and bolted with each of the incremental masses 606 with the help of high tension countersunk bolts 654. In an embodiment, the incremental masses 606 may be composed of up to 9% of total mass of the pinion 502.

In an embodiment, a strength calculation is carried out to optimize size and number of countersunk bolts 654 to be used to fasten each of the incremental masses 606 with the disk 655 by comparison of clamping force of bolts and centrifugal force generated due to possible unbalance. Clamping length calculation shall be carried for all combination of added masses 606 to ensure they do not get loosened during prolonged operation. In addition, a bearing retainer compound shall be used to secure the position of the countersunk bolts 654. Once fixing of the incremental masses 606 or removal of plugged mass 606 is done, the through bolt 608 is tightened to secure the plugged masses 606 and to enable slow rotation of the pinion 502 for alignment. Thus, the proposed tuning system can modulate resonant frequency of the pinion 502 so as to mitigate super-synchronous vibration of the pinion 502.

Figure 7:
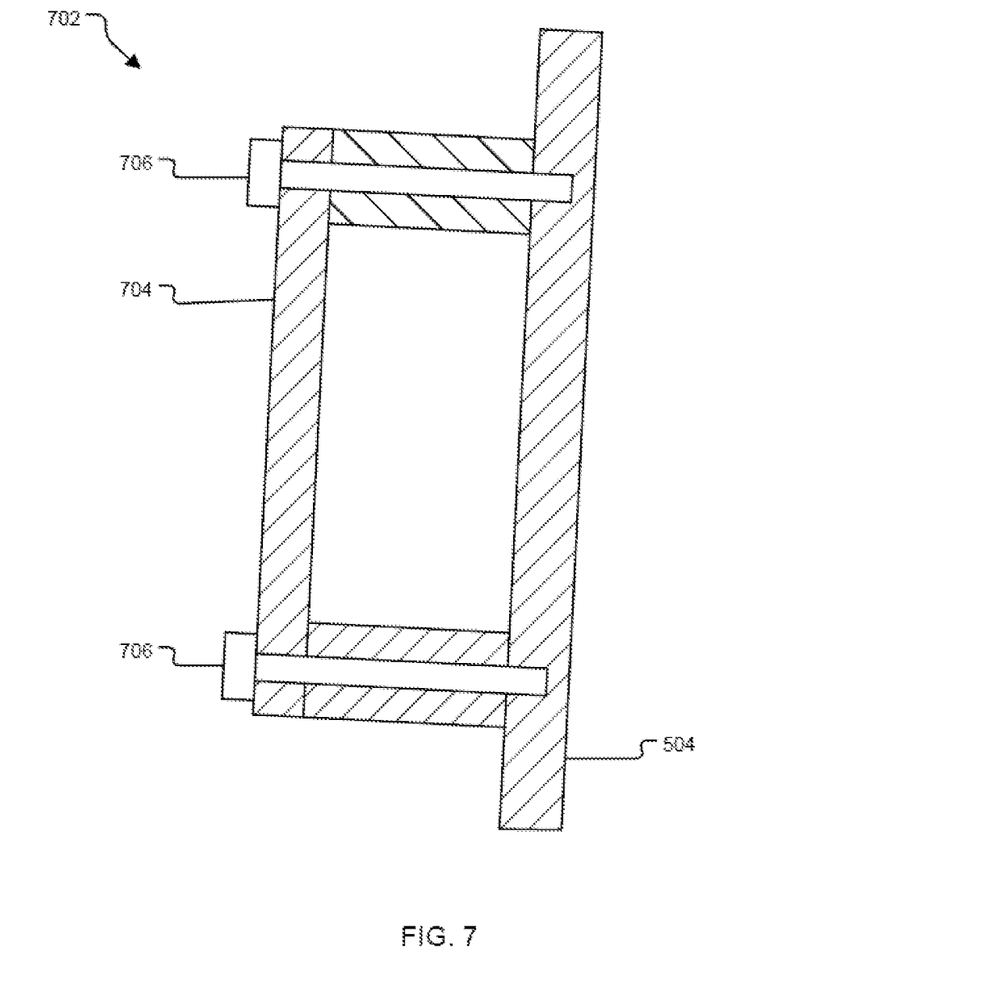
FIG. 7 illustrates an exemplary representation of a fixing attachment used to secure the incremental masses with the pinion in accordance with an embodiment of the present disclosure.

FIG. 7 illustrates an exemplary representation of a fixing attachment used to secure the incremental masses with the pinion in accordance with an embodiment of the present disclosure. In an embodiment, to secure the spinning incremental masses 606 on NDE side 504 of the pinion 502, a thick cylindrical element 702 having perforation along its length may be installed with an adequately sized cover 704. The thick cylindrical element 702 may be bolted with the piston NDE side 504 of the casing by application of one or more bolts 706 that pass through the thick cylindrical element 702 and are connected in threaded arrangement with pinion NDE side 504 of the gearbox casing. In an embodiment, attachment of the thick perforated cylindrical element 702 on pinion NDE side 504 of the gearbox casing ensures safety and avoids high temperature due to windage of the pinion 502 at high rotational speeds. In an embodiment, the tuning system achieves pinion resonance by modulating resonant frequency of the pinion 502.

In an embodiment, the thick cylindrical element 702 is used to secure the incremental masses 606 with pinion NDE side 504 of the casing once trial runs are performed with the detuned pinion 502 at affected load-speed combinations. When vibrations in the detuned pinion 502 are well within acceptable limits, then the thick cylindrical element 702 is used to secure the incremental masses 606 with pinion NDE side 504 of the casing.

Thus, the present disclosure pertains to tuning system for modulating stiffness of a gearbox and a pinion, the tuning system including one or more incremental masses adapted to be attached to a non-drive end (NDE) side of a pinion of the gearbox to allow modulation of resonant frequency of the pinion, and a plurality of tie rods coupled between a base plate of the gearbox and split axial line of a casing of the gearbox, wherein the plurality of tie rods are adapted to modulate effective stiffness of the casing in a specific direction. The proposed tuning system inhibits complex analytical calculations required for modulation of resonant frequency of the casing and the pinion, and further eliminates the requirement of any kind of hot working at the installation site of the gearbox.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

ADVANTAGES OF THE INVENTION

The present disclosure provides a tuning system for a transmission tuning system/gearbox to allow modulation of effective stiffness of the gearbox in a particular direction.

The present disclosure provides a tuning system for a gearbox that prevents a particular resonant mode of the gearbox by altering effective stiffness of the gearbox.

The present disclosure provides a tuning system for a gearbox that allows modulation of effective stiffness of the gearbox without disassembly of gearbox components and without removal of the gearbox from the site.

The present disclosure provides a tuning system for modulating stiffness of a pinion of the gearbox that mitigates super-synchronous vibration conditions.

The present disclosure provides a tuning system for modulating resonant frequency of the pinion in order to achieve pinion resonance.

The present disclosure provides a tuning system for a gearbox that eliminates implementation of intricate analytical and iterative methods to alter effective stiffness of the gearbox.

The present disclosure provides a tuning system for a gearbox that does not requires hot working such as, welding, gas cutting to be carried out at a site where the gearbox is installed to effect modulation of stiffness of the gearbox.

I claim:

1. A tuning system for modulating stiffness of a gearbox and a pinion, the tuning system comprising:
   one or more masses adapted to be attached to a non-drive end (NDE) side of the pinion of the gearbox to allow modulation of resonant frequency of the pinion; and
   a plurality of tie rods coupled between a base plate of the gearbox and split axial line of a casing of the gearbox, wherein the plurality of tie rods are adapted to modulate stiffness of the casing in a specific direction.

2. The tuning system of claim 1, wherein each of the plurality of tie rods has a first part coupled to a protrusion of one or more base plate holding bolts of the gearbox and a second part coupled to a protrusion of one or more tightening bolts fixed with the axial split line of the casing.

3. The tuning system of claim 2, wherein the plurality of tie rods are coupled between the protrusion of the one or more base plate holding bolts and the protrusion of the one or more tightening bolts fixed with the axial split line of the casing to allow tuning of resonant frequency of the gearbox at a site without performing disassembly of one or more components of the gearbox.

4. The tuning system of claim 2, wherein each of the plurality of tie rods comprises a threaded stud disposed between the corresponding first part and the corresponding second part, wherein one or more lock nuts are provided on both sides of the threaded stud to fix each of the plurality of tie rods once the threaded stud is fully locked.

5. The tuning system of claim 1, wherein a plurality of protruded studs are welded at locations of the casing, and wherein one or more flat metal bars having a set of drilled holes are screwed with each of the plurality of protruded studs.

6. The tuning system of claim 5, wherein at least one of the plurality of protruded studs is configured with one or more weight elements, and wherein each of the one or more weight elements comprises a slot to allow securing of the one or more weight elements with the at least one of the plurality of protruded studs by inserting a rod into the slot.

7. The tuning system of claim 1, wherein the pinion has a centered groove at its NDE side to allow attachment of the one or more masses with the pinion by fastening a through bolt into the centered groove to secure the one or more masses with the pinion.

8. The tuning system of claim 7, wherein interaction of the through bolt with the centered groove allows attachment and detachment of the one or more masses with the NDE side of the pinion.

9. The tuning system of claim 1, wherein each of the one or more plugged masses is composed of up to 9% of total mass of the pinion.

10. The tuning system of claim 1, wherein each of the one or more masses comprises at least one disk secured to each of the one or more masses through a set of mating grooves, and wherein each of the one or more plugged masses is screwed with the at least one disk using three or more countersunk bolts to hold the one or more masses with the pinion.

* * * * *